Dec. 25, 1934.  M. A. SMITH  1,985,386

BEARING

Filed March 11, 1932

INVENTOR.
MARSHALL A. SMITH
BY
ATTORNEY

Patented Dec. 25, 1934

1,985,386

UNITED STATES PATENT OFFICE 1,985,386

BEARING

Marshall A. Smith, South Bend, Ind., assignor to Bendix Aviation Corporation, South Bend, Ind., a corporation of Delaware Application March 11, 1932, Serial No. 598,242

14 Claims. (Cl. 308—219)

This invention relates to bearings and in particular to thrust bearings.

Broadly, the invention comprehends bearings designed to reduce by self-adjustment frictional wear and to equalize pressure upon the parts thereof.

It is well established in the art that in bearings of this particular type, the elements thereof will adjust themselves through the power of least resistance, thereby equalizing the load and at the same time within certain limits, correct the errors and inaccuracies existing in the parts themselves.

An object of the invention is to provide a thrust bearing, having means for equalizing the load upon the bearing.

A feature of the invention is a thrust bearing having tapered rollers positioned between roller races.

Another feature of the invention is to provide a thrust bearing having tapered rollers positioned between roller races and equalizing members connecting the rollers in series.

Another feature of the invention is to provide a thrust bearing including tapered rollers positioned between roller races with a cage surrounding the roller races, and equalizing means interposed between the cage and the roller races connecting the tapered rollers in series.

A further feature of the invention is a thrust bearing having a cage provided with a circumferential groove or channel with equalizing bars arranged therein with their adjacent ends supporting saddles on which are positioned ball bearings in direct thrust engagement with a tapering roller positioned between suitable roller races.

Other objects and features of the invention will be apparent from the following description taken in connection with the drawing, which forms part of this specification, and in which.

Figure 1:
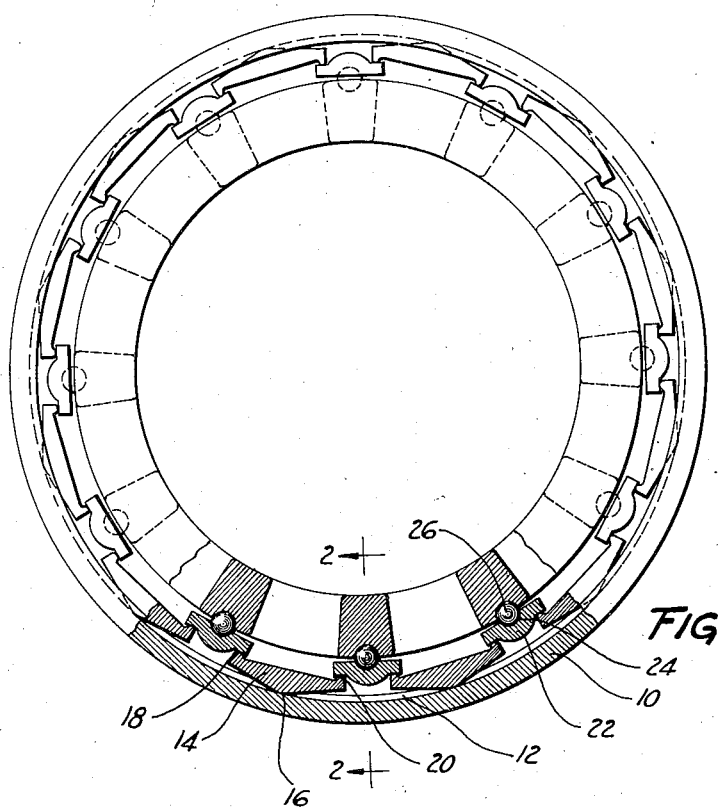
Figure 1 is a top plan view of a thrust bearing partially broken away.

Referring to the drawing for more specific details of the invention, 10 represents a load equalizer cage including a ring or band having a circumferential slot or groove 12, and arranged in spaced relation in the slot or groove are load equalizing bars 14. As shown, each of these bars have centrally of their lengths an angular portion 16, seated in the circumferential slot or groove, and the respective ends of the bars have lugs 18 and 20. The adjacent lugs support a saddle 22 provided with a recess 24 in which is seated a ball bearing 26, the object of which will hereinafter appear.

Arranged concentrically with respect to the load equalizing cage are corresponding and oppositely disposed races 28 and 30. The opposed faces of these races are oppositely beveled as indicated at 32 and 34, and positioned for rotation between these beveled faces in spaced relation are tapering rollers 36 provided in their outer ends with recesses 38 for the reception of the ball bearings 26.

Figures 2, 3:
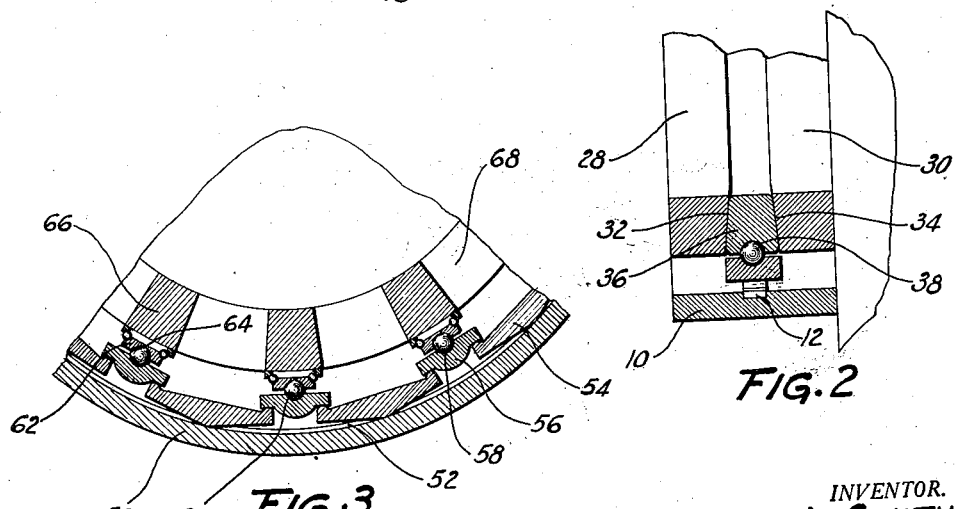
Figure 2 is a sectional view substantially on line 2—2 Figure 1.
Figure 3 is a fragmentary view of a thrust bearing illustrating a modification.

A modification of the invention is illustrated in Figure 3. In this modification there is provided a load equalizing cage 50, having a circumferential slot or groove 52, in which are arranged, in spaced relation, equalizing bars 54, supporting saddles 56, having depressions 58, in which are seated ball bearings 60. Small races 62, have depressions or recesses 64 for the reception of the ball bearings 60 in direct thrust engagement with tapered rollers 66, positioned between suitable races 68.

In both the preferred and modified forms of the invention there is provided within certain limits, freedom of movement in the bearing and the self-adjusting means for equalizing the load. This is due to the particular structure and arrangement of the equalizing bars, the saddles supported thereby, and the anti-frictional means carried by the saddles in direct thrust engagement with the tapered rollers between the races.

It is well established that regardless of how carefully designed and manufactured, it is nearly impossible if not impossible, to secure the exactness essential for perfect theoretical operation, and the repeated use and wear of the bearings frequently causes or exaggerates the errors and inaccuracies made in manufacture. In the structure herein shown friction is reduced to a minimum by the self-adjustment of the parts, and wear and inaccuracy is compensated for by the equalization of the pressure on the part.

While preferred embodiments of the invention have been described, it is to be understood that these are given merely as examples of the underlying principles of the invention, and since these may be incorporated in other specific mechanical structures, I do not intend to be limited to those shown except as such limitations are clearly imposed by the appended claims.

Having thus described the various features of the invention, what I claim as new and desire to secure by Letters Patent, is:

1. A thrust bearing comprising a pair of opposed races having oppositely beveled faces, tapered rollers positioned between the beveled faces, and self equalizing means including an outer annular ring member and levers engaging the outer ends of the rollers and said ring member.

2. A thrust bearing comprising opposed races having oppositely arranged beveled faces, tapering rollers positioned between the faces, ball bearing members engaging the outer ends of the rollers, and equalizing bars connecting the ball bearing members.

3. A thrust bearing comprising opposed races, having oppositely arranged beveled faces, tapering rollers positioned in spaced relation between the faces, a saddle having an anti-friction engagement with the outer end of the rollers, and equalized bars connecting the saddles.

4. A thrust bearing comprising races having opposed beveled faces, tapering rollers positioned between the faces having recesses in their outer ends, ball bearings positioned in the recesses, saddles having recesses for the reception of the balls, and equalizing bars connecting the saddles.

5. A thrust bearing comprising opposed races having oppositely arranged beveled faces, rollers positioned in spaced relation between the beveled faces having recesses in their outer ends, ball bearings positioned in the recesses, saddles having recesses for the reception of the ball bearings, equalizing members connecting the saddles, and means for supporting the equalizing members.

6. A thrust bearing comprising opposed races having oppositely arranged beveled faces, tapering rollers positioned in spaced relation between the beveled faces, saddles associated with the rollers, anti-friction devices between the saddles and the rollers, equalizing bars connecting the saddle, and a ring supporting the bars.

7. A thrust bearing comprising a load equalizing cage including a ring having a circumferential groove, equalizing bars arranged in spaced relation in the groove, saddles supported by the equalizing bars, anti-friction members on the saddle, tapering rollers in thrust engagement with the anti-friction members, and races for the rollers.

8. A thrust bearing comprising a load equalizing cage including a band having a circumferential groove, equalizing bars arranged in spaced relation within the groove, saddles supported by the equalizing bar, anti-friction members on the saddles, rollers in direct thrust engagement with the anti-friction members and opposed races for the rollers.

9. A thrust bearing comprising an outer annular cage, a pair of opposed races within the cage, rollers between the races and equalizing means engaging the cage and rollers.

10. A thrust bearing comprising an annular cage, a pair of opposed races within the cage, rollers between the races and interconnecting equalizing members centrally fulcrumed alternately on the cage and the rollers to equalize pressure on the rollers.

11. A thrust bearing comprising an annular cage, a pair of opposed races within the cage, rollers between the races, and means fulcrumed on the cage for equalizing the radial thrust on the rollers.

12. A thrust bearing comprising an annular cage, opposed races within the cage, tapering rollers between the races, and interconnecting members engaging the cage and the rollers for equalizing thrust on the rollers.

13. A thrust bearing comprising a pair of opposed races having oppositely arranged beveled faces, tapering rollers arranged in spaced relation between the faces, and inter-engaging equalizing lever members, alternate lever members of which are each connected at their central portion to a corresponding roller.

14. A thrust bearing comprising a pair of opposed races, rollers positioned between the races, and means including an annular ring member arranged outside of the outer ends of said rollers and equalizing means between the ring and the outer ends of said rollers for equalizing radial thrust on said rollers.

MARSHALL A. SMITH.